Figure 1:
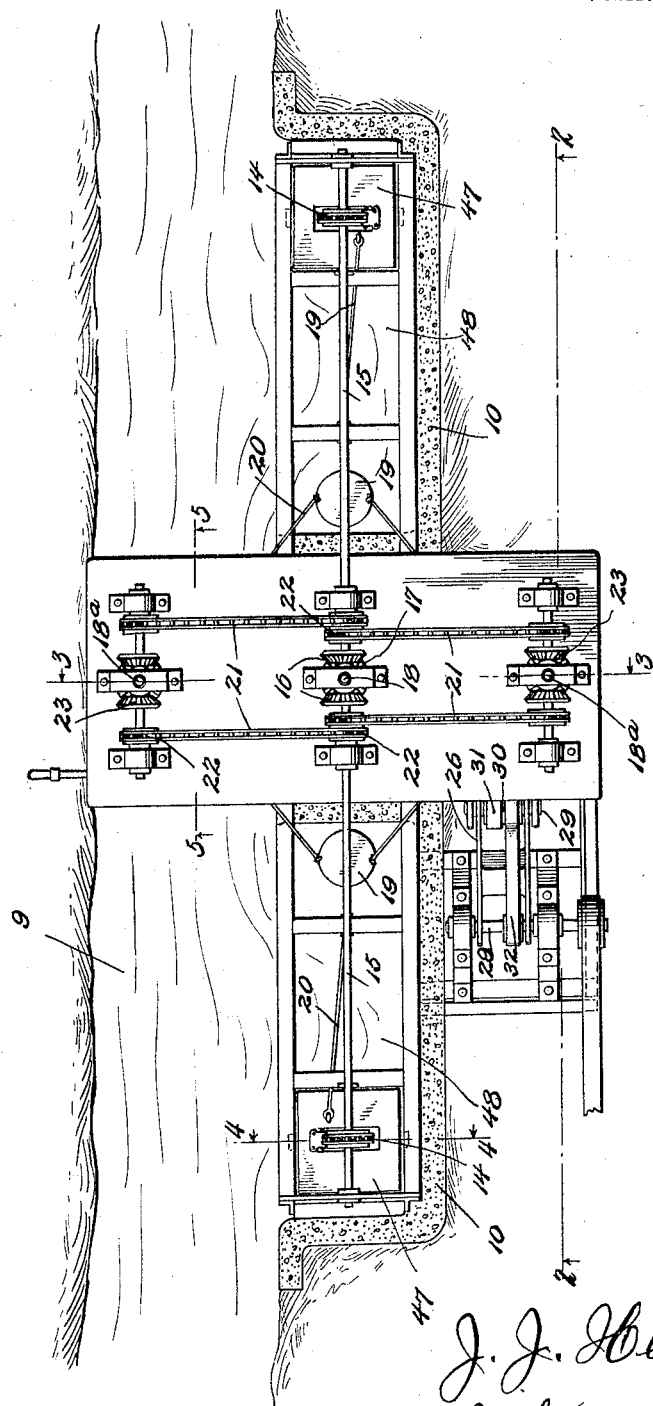

J. J. HENDLEY.
WATER WHEEL.
APPLICATION FILED JAN. 8, 1921.

1,401,077.

Patented Dec. 20, 1921.
4 SHEETS—SHEET 1.

Inventor
J. J. Hendley
By John Boyle Jr.
Attorney

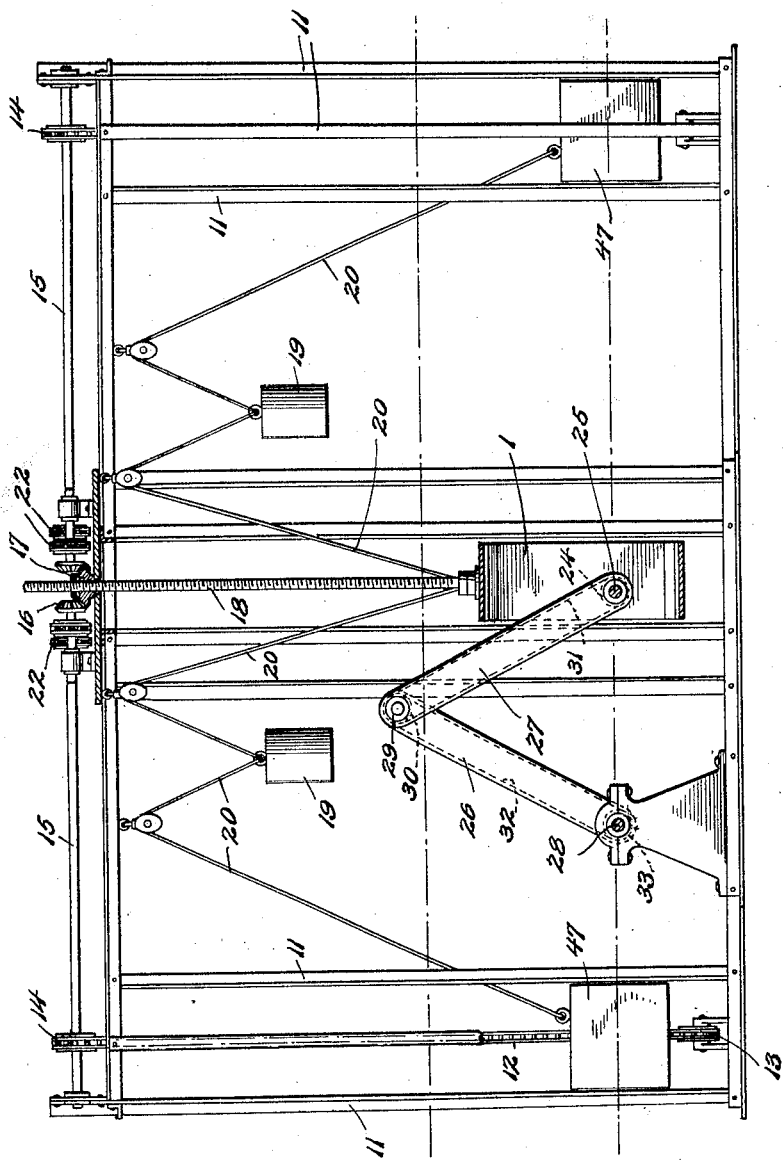

J. J. HENDLEY.
WATER WHEEL.
APPLICATION FILED JAN. 8, 1921.
1,401,077.
Patented Dec. 20, 1921.
4 SHEETS—SHEET 3.
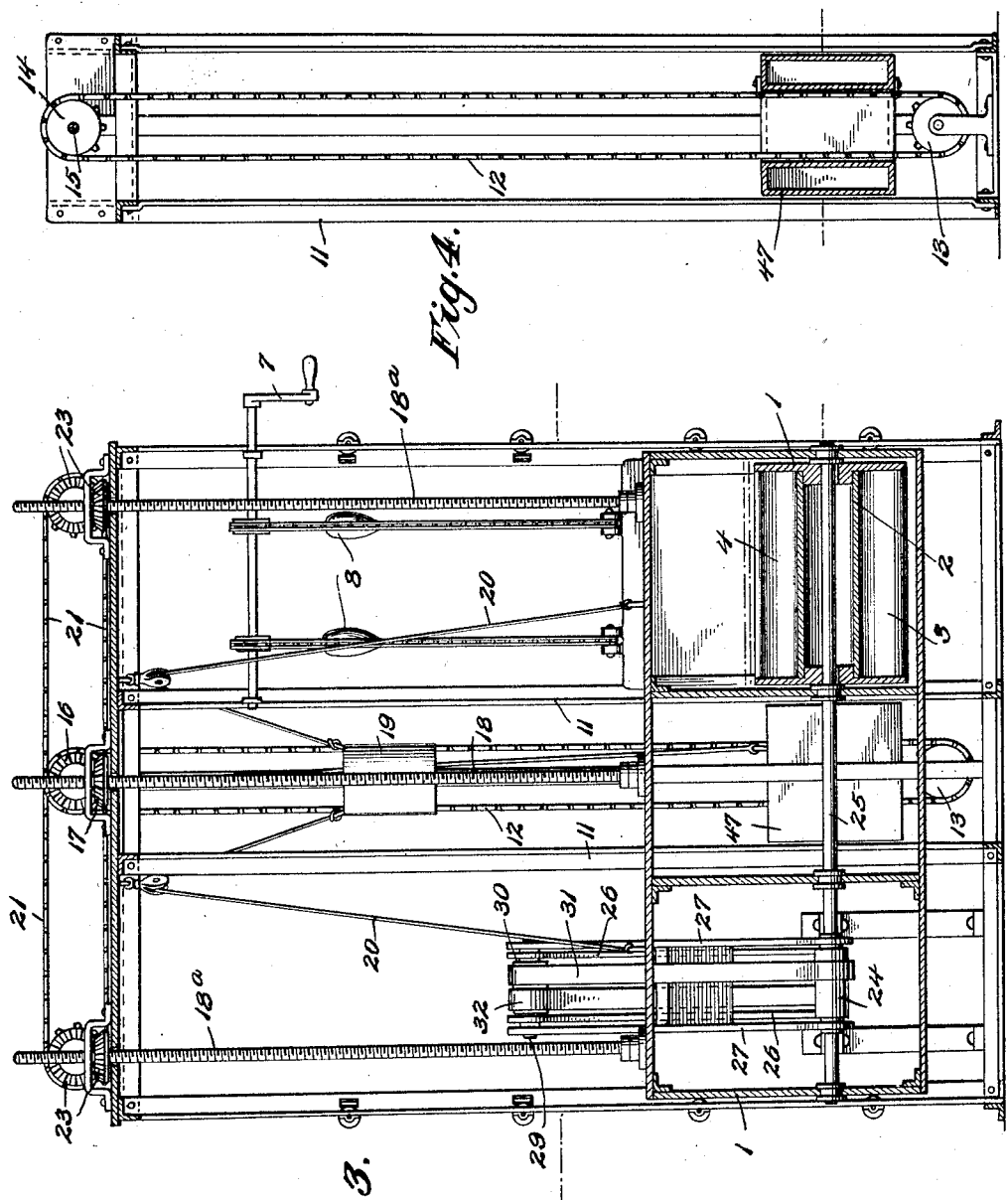

J. J. HENDLEY.
WATER WHEEL.
APPLICATION FILED JAN. 8, 1921.
1,401,077.
Patented Dec. 20, 1921.
4 SHEETS—SHEET 4.
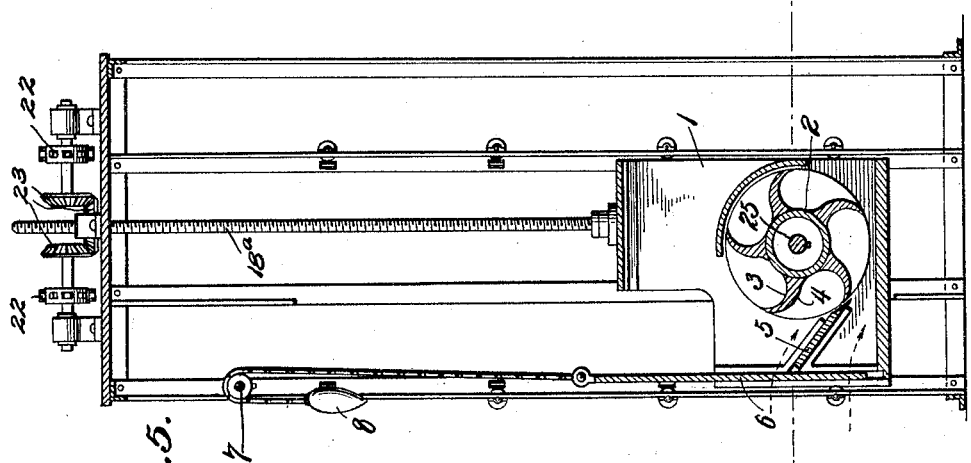
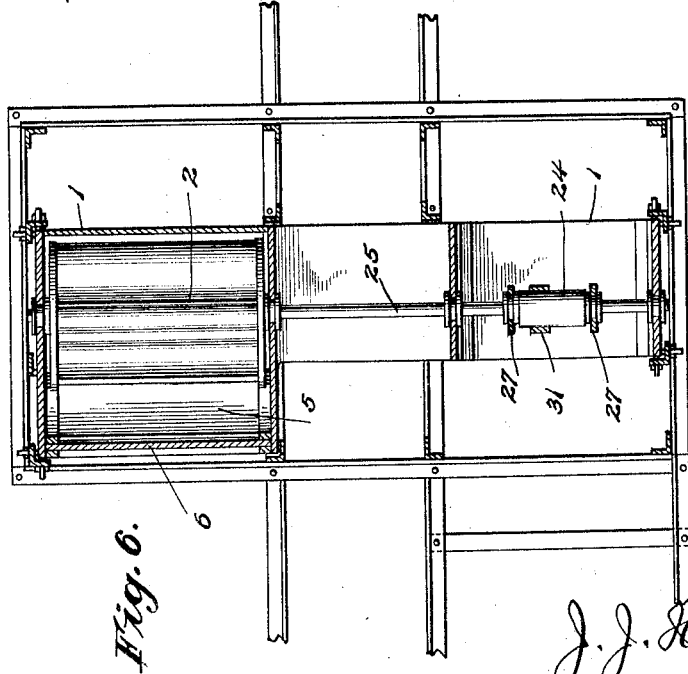
Inventor
J. J. Hendley
By John Boyle Jr.
Attorney

UNITED STATES PATENT OFFICE.

JOHN J. HENDLEY, OF BRUNSWICK, GEORGIA.

WATER-WHEEL.

1,401,077. Specification of Letters Patent. Patented Dec. 20, 1921.

Application filed January 8, 1921. Serial No. 435,850.

*To all whom it may concern:*

Be it known that I, JOHN J. HENDLEY, a citizen of the United States, residing at Brunswick, in the county of Glynn and State of Georgia, have invented certain new and useful Improvements in Water-Wheels, of which the following is a specification.

My invention relates to water wheels and one of the objects is to devise a wheel of this character which can be adapted to accommodate itself to changes in the level of the water, without affecting the efficiency of the wheel. My wheel is particularly adapted to be used in fresh water streams where the level of the stream changes due to the occurrence of freshets. It may also be used in connection with bodies of salt water where the level is constantly changing on account of tidal influences.

Another object of the invention is to provide a wheel having a particular shape of blade so that there will be a minimum amount of backlash when the wheel is running.

Another object of the invention is to provide a suitable flexible connection for transmitting the power of the wheel to an electric motor and which transmission may take place without being affected by the level of the water wheel.

With these and other objects in view, my invention consists in certain novel and peculiar features of construction and combination of parts as hereafter described and claimed, and in order that it may be fully understood, reference is to be had to the accompanying drawings in which—

Figure I is a plan view of my water wheel installation;

Fig. II is a section on the line 2—2 of Fig. I;

Fig. III is a section on the line 3—3 of Fig. I;

Fig. IV is a section on the line 4—4 of Fig. I;

Fig. V is a vertical transverse section through the water wheel;

Fig. VI is a horizontal section through the water wheel.

Referring to the drawings for a more complete disclosure of the invention, 1 is the water wheel unit, comprising a wheel 2 provided with half round buckets 3, having similar external half round surfaces 4. The object of such a shaped surface to the buckets is to give the greatest efficiency by diminishing, in so far as possible, the backlash caused when the blades leave the water. The wheel may be used either as an undershot or overshot wheel and with that end in view there is provided a partition 5 for directing the stream of water. For regulating the amount of water to be delivered to the wheel, there is provided a vertically reciprocating gate 6, operated by a hand crank 7, counterweight 8 being provided to facilitate operation of the same. In the position shown in Fig. V the wheel is functioning as an undershot wheel. By raising the gate above the partition 5, the wheel may operate both as an overshot and undershot wheel. The water wheel unit 1 is adapted to reciprocate vertically with a rise and fall of the water in the stream.

In order to effect this movement there are provided floats 47 which are located in a pool 48, offset from the main body of the stream 9. This pool may be provided with a retaining wall 10 to prevent erosion of the bank. With the rise and fall of the water, the floats reciprocate in the guides 11. Secured to the floats are sprocket chains 12, which coöperate with an idle sprocket wheel 13 and a sprocket wheel 14 which is secured to a shaft 15. On the opposite end of the shaft 15 is fixed a beveled gear 16 meshing with a beveled gear 17, which latter is in screw engagement with the screw 18. The screw 18 is secured to the water wheel unit 1. As the floats reciprocate with the rise and fall of the water, the shafts 15 are caused to turn through the medium of the sprocket chains 12, thereby rotating the beveled gears 17 and causing a synchronous rise and fall of the water wheel unit. In order to facilitate the operation of these parts, counterweights 19 are provided suspended from cables 20 connected both to the floats and the water wheel unit. Suitable antifriction bearings may be interposed between the reciprocating parts to facilitate movement thereof. Although a single screw 18 is sufficient to cause movement of the water wheel unit, in order to produce smoothness of operation, I may provide additional screws 18$^a$. The rotary motion of the shafts 15 may be transmitted thereto, by means of a sprocket chain 21, sprocket wheels 22 and beveled gears 23. For taking off the developed power of the water wheel, a pulley 24 is secured to the shaft 25. A linkage 26, 27 is connected to the shaft 25 and the shaft 28, which latter shaft is coupled in a suitable manner to an electric generator. Carried by the shaft 29, which is at the knuckle of the linkage, is a pulley 30. Carried by the shaft 28 is another pulley 33. A belt 31 transmits the power from the pulley 24 to the pulley 30 and a similar belt 32 transmits the power from the pulley 30 to the pulley 33. It will be noted therefore that regardless of the height of the water wheel, it is always possible to take off the power therefrom regardless of its position.

From the above description it will be apparent that I have produced a device of the character described, which possesses all the features enumerated as desirable, and while I have illustrated and described the preferred embodiment of my invention, it will be understood that I reserve the right to all changes properly falling within the spirit and scope of the appended claims.

Therefore what I claim as new and desire to secure by Letters Patent is:

1. A fluid current motor comprising a water wheel unit adapted to be reciprocated with the rise and fall of the water current, a float in proximity to the water wheel and adapted to rise and fall with changes in the water level, a screw carried by the water wheel unit, a rotary shaft in engagement with the screw, and means interposed between the shaft and float for rotating the shaft to reciprocate the screw and the water wheel unit.

2. A fluid current motor comprising a water wheel adapted to be reciprocated with the rise and fall of the water current, a shaft upon which the water wheel is mounted, a link pivotally connected with the shaft, a second link pivotally connected to the first link and to a second shaft, belt connections carried by the said links for transmitting the rotary motion of the first shaft to the second shaft.

In testimony whereof I affix my signature.

Dr. JOHN J. HENDLEY.